(12) United States Patent
Tsao et al.

(10) Patent No.: US 10,708,426 B1
(45) Date of Patent: Jul. 7, 2020

(54) GENERATING INTELLIGENT CONTACT ROUTING CONFIGURATIONS

(71) Applicant: Talkdesk, Inc, San Francisco, CA (US)

(72) Inventors: Rachel Tsao, San Francisco, CA (US); Miguel Mota, Lisbon (PT); Tiago Gurreiro, Lisbon (PT); Rafael Baltazar, Lisbon (PT)

(73) Assignee: TALKDESK INC., San Francisco, CA (US)

( * ) Notice: Subject to any disclaimer, the term of this patent is extended or adjusted under 35 U.S.C. 154(b) by 0 days.

(21) Appl. No.: 16/549,565

(22) Filed: Aug. 23, 2019

Related U.S. Application Data

(60) Provisional application No. 62/850,870, filed on May 21, 2019.

(51) Int. Cl.
*H04M 3/51* (2006.01)
*H04M 3/523* (2006.01)

(52) U.S. Cl.
CPC ......... *H04M 3/5183* (2013.01); *H04M 3/523* (2013.01); *H04M 2203/558* (2013.01)

(58) Field of Classification Search
CPC .............. H04M 3/5183; H04M 3/523; H04M 2203/558
USPC ............. 379/265.09, 265.11, 265.05, 265.01
See application file for complete search history.

(56) References Cited

U.S. PATENT DOCUMENTS

| | | | |
|---|---|---|---|
| 2006/0227961 A1* | 10/2006 | Lai ...................... | H04M 3/5237 379/265.02 |
| 2014/0046858 A1* | 2/2014 | Werner .................. | G06Q 30/01 705/304 |

* cited by examiner

*Primary Examiner* — Thjuan K Addy

(57) ABSTRACT

A system provides an interface within a CRM system that allows a user to select a routing option for a contact (e.g., phone number) based on a specified CRM data object by allowing a data dip into the CRM database. The system then provides the CRM data and the selected routing option to the communications management system where the communications management system updates a routing state machine and activates the selected routing option for the contact.

20 Claims, 22 Drawing Sheets

GENERATING INTELLIGENT CONTACT ROUTING CONFIGURATIONS

CROSS-REFERENCE TO RELATED APPLICATIONS

This application claims priority to U.S. Provisional Application Ser. No. 62/850,870 filed on May 21, 2019. The contents of which are hereby incorporated by reference.

BACKGROUND

Modern companies and organizations use a variety of technologies to manage and organize contact with customers, employees, and members. For example, a company may use a contact center as a primary touch point for customers to reach out to the company with a variety of requests and needs (e.g., customer support, product information, etc.). In addition, the same company may also use a customer-relationship management system (or CRM system) to maintain and organize the company's interaction with current and potential customers. While modern CRM systems can receive and use data from a contact center, often there is a disconnect between the two systems that complicates or prevents the use of data from the CRM system to perform actions in the contact center.

One example of this disconnect is contact routing (e.g., call routing) within a contact center. While many contact centers offer various options to set up contact routing within the contact center itself, the process of setting contact routing within a contact center can be time consuming because the proper routing often depends on data within the company's CRM system. In the past, many attempts have been made to integrate CRM data into a contact center routing. However, typically, setting up contact center routing integrated with CRM data is a time consuming process that takes weeks and months of engineering time and large amounts of resources. Moreover, the end solution is often inflexible, difficult to navigate, and requires significant training and expertise to successfully use. Moreover, the result is often a separate application that does not easily achieve contact routing in a simple way that an agent, call center supervisor, or administrator can do on their own. Thus, there are several disadvantages with regard to conventional communication management systems.

SUMMARY

One or more embodiments described herein provide benefits and solve one or more of the foregoing or other problems in the art with systems, methods, and non-transitory computer readable media that provide an interface within a customer-relationship management system (CRM system) that a user can access to setup routing (e.g., call routing) within a communication management system (e.g., contact center) using data within the CRM system. For example, in one or more embodiments, the system provides an interface within a CRM system that allows a user to select a routing option for a contact (e.g., phone number) based on a specified CRM data object by allowing a data dip into the CRM database. The system then provides the CRM data and the selected routing option to the communication management system where the communication management system updates a routing state machine and activates the selected routing option for the contact.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
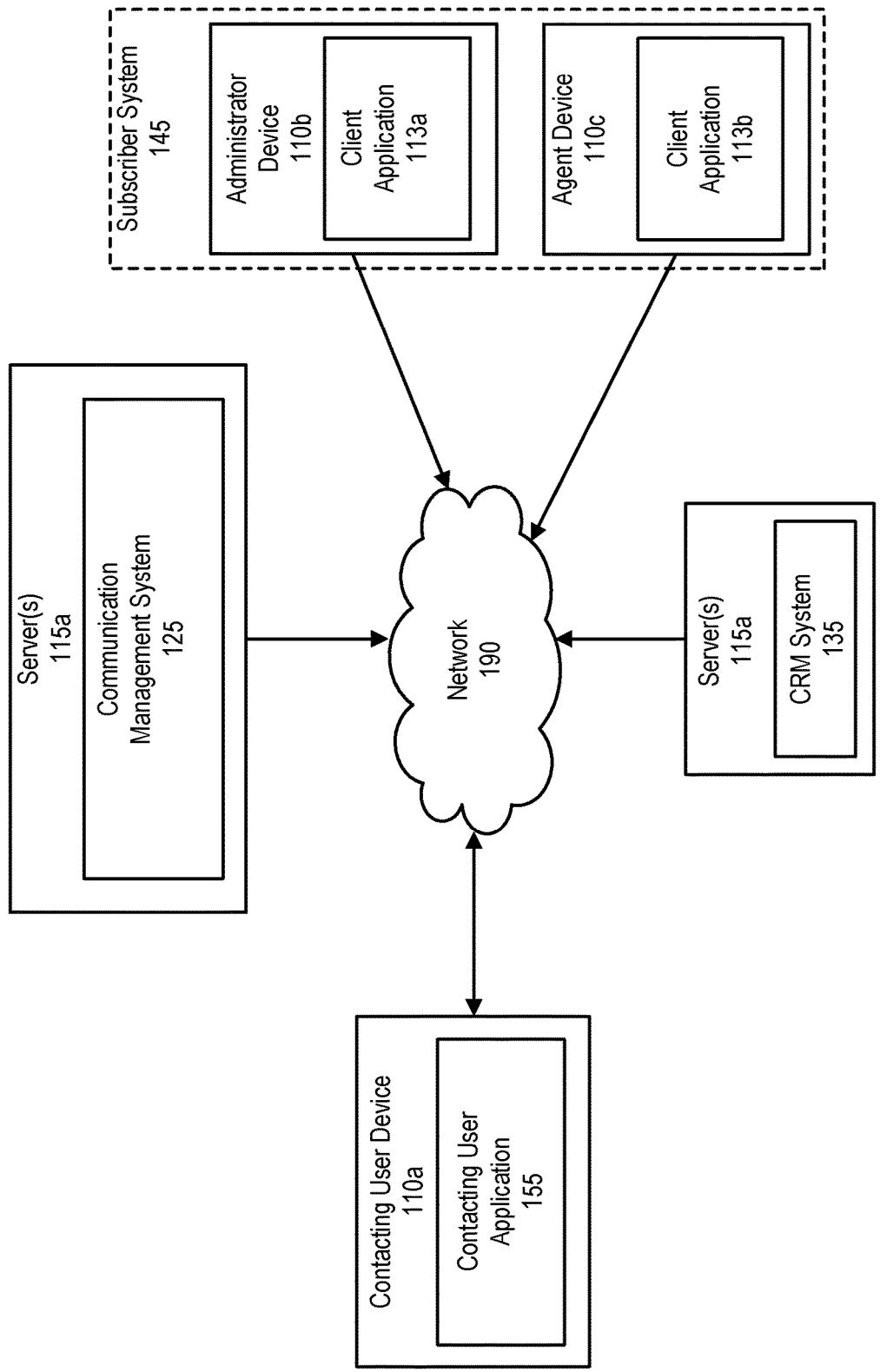
FIG. 1 illustrates an example routing system in accordance with one or more embodiments.

One or more embodiments described herein provide benefits and solve one or more of the foregoing or other problems in the art with systems, methods, and non-transitory computer readable media that provide an intelligent routing interface within a customer-relationship management system (CRM system) that a user can access to setup routing (e.g., call routing) within a communication management system (e.g., a contact center) using data within the CRM system. For example, in one or more embodiments, a routing system provides an intelligent routing interface within a CRM system that allows a user to select a routing option for a contacting user (e.g., phone number) based on a specified CRM data object by allowing a data dip into the CRM database. The routing system then provides the CRM data and the selected routing option to the communication management system to update a routing state machine within the communication management system and activate the selected routing option for the contact.

In some embodiments, for example, the routing system provides an intelligent routing interface within a CRM system to allow a user to easily set a routing flow for a specified contacting user. For instance, the intelligent routing interface can provide defined routing options (also referred to herein as parameters) with respect to defined CRM data objects. A user can select a routing option, and in response, the routing system performs a data dip (e.g., accesses CRM data) that provides available agents and/or ring groups associated with the data object. For example, a data object in the CRM system can represent a case, a lead owner, a contact owner, an account owner, or any other type of customer relationship defined within a CRM system.

Once the intelligent routing interface collects the routing option and the CRM data, the routing system sends this information to the communication management system (e.g., via an API) to set up the routing within the communication management system. In one or more embodiments, the routing system includes a state machine within the communication management system. The state machine saves the current and active routing flows that are used by the communication management system to route contacts (e.g., calls, IM, text messages, etc.). In addition, the state machine ensures that there are no conflicting routing flows. Accordingly, upon the routing system providing the routing parameters and CRM data to the communication management system, and the routing system updates the state machine and/or activates the routing flow defined at the CRM, as described above. At this point, the routing flow is active and when the contacting user communicates with the communication management system, the communication management system detects the contacting user (e.g., detects the phone number), accesses the routing flow defined for the contacting user within the state machine, and routes the call accordingly.

Based on the above principles and the below disclosed details, the routing system described herein provides various advantages compared to conventional systems. For instance, the routing system streamlines routing configuration into seconds (instead of days or weeks) with a guided workflow that exposes CRM objects with available agent numbers and agent ring groups. The guided workflow provides a unique graphical user interface that allows a user to set a routing flow in an efficient manner and by reducing the number of interactions needed to generate a flow and access data to activate the flow (e.g., a data dip) compared to conventional systems. In addition, the routing system automatically imports agent numbers and ring groups into the communication management system routing platform saving time and increasing efficiency of the routing system. Furthermore, the routing system allows routing to be configured by CRM object view recency and/or view frequency, thus creating the most effective routing flow for a specific contacting user. Moreover, the routing system allows routing to easily be defined by if/then logic in a step-by-step guided process that is completed with a few user selections, compared to custom coding that is required in conventional systems. Additionally, the state machine ensures that there are no routing conflicts when a user creates or updates a routing flow.

As illustrated by the foregoing discussion, the present disclosure utilizes a variety of terms to describe features and benefits of the communication management system. Additional detail is hereafter provided regarding the meaning of these terms as used in this disclosure. In particular, the term "contacting user" refers to a user that contacts the communication management system. A contacting user can refer to a user that is experiencing a problem or issue with a service system and that contacts the communication management system in an attempt to resolve the problem or to inform others of the problem. For example, a contacting user can include a caller, a chat user, or a text message user that sends an electronic communication to the communication management system. The term "communication" refers to a communication such as a phone call, chat message, text message, instant message, or video call that the communication management system can receive from a contacting user.

Relatedly, the term "agent user" or "agent" refers to an individual or system associated with the communication management system or a service system and that assists a contacting user via electronic communication correspondence. Indeed, the communication management system can connect a contacting user who needs to reschedule a flight with an agent user affiliated with the relevant airline system.

The term "CRM data object" or "CRM object" refers to a data structure that is referenced by an identifier. For instance, CRM objects include data structures that define an association between data and a database entity within a CRM system. For instance, a CRM object can represent a case that has a case owner within the CRM system, a lead that has a lead owner, a contact that has a contact owner or agent, an account that has an account owner, or any other type of customer-relationship that is defined within a CRM system. In one or more embodiments, the CRM object is associated with an agent, multiple agents, a ring group (e.g., a group of agents associated with a particular team, customer service specialty, contact, account, etc.) and numbers or identifiers associated with the agent or ring groups.

As used herein, the term "routing flow" refers to a road map of how a contact (e.g., a call) from a contacting user is routed within a communication management system. For example, upon receiving a call, the communication management system can identify the phone number and access the routing flow for that phone number. The routing flow can specify to first attempt to contact a particular agent phone number if available, but if that agent is not available, then the routing flow can specify to contact one of a number of agents within a specified ring group. Thus, the routing flow defines a priority of agents and/or ring groups to where the call should be routed.

Additional detail regarding the communication management system will now be provided with reference to the figures. For example, FIG. 1 illustrates a schematic diagram of an example environment for implementing a routing system in accordance with one or more embodiments. An overview of the routing system is described in relation to FIG. 1. Thereafter, a more detailed description of the components and processes of the communication management system is provided in relation to the subsequent figures.

As shown in FIG. 1, the routing system includes server(s) 115a hosting a communication management system 125, server(s) 115b hosting a CRM system 135, a subscriber system 145, an administrator device 110b, an agent device 110c, a contacting user device 110a, and a network 190. Each of the components of the environment can communicate via the network 190, and the network 190 may be any suitable network over which computing devices can communicate.

As mentioned, the routing system can include different client devices 110 such as a contacting user device 110a, an administrator device 110b, and an agent device 110c. The contacting user device 110a can be one of a variety of computing devices, including a smartphone, tablet, smart television, desktop computer, laptop computer, virtual reality device, augmented reality device, or other computing device as described in relation to FIG. 13. Although FIG. 1 illustrates a single contacting user device 110a, in some embodiments the environment can include multiple different contacting user devices 110a, each associated with a different contacting user. The contacting user device 110*a* can receive user input and other information and provide the information (including communication dialogue and contacting user information) to the server(s).

As shown, the contacting user device 110*a* includes a contacting user application 155. In particular, the contacting user application 155 may be a web application, a native application installed on the contacting user device 110*a* (e.g., a mobile application, a desktop application, etc.), or a cloud-based application where part of the functionality is performed by the server(s) 115. The contacting user application 155 can present or display information to a contacting user, including information relating to EWT options for processing an electronic communication to help a contacting user accomplish a desired purpose. A contacting user can interact with the contacting user application 155 to provide user input to, for example, select an EWT option for processing an electronic communication or provide communication dialogue.

As also mentioned, the routing system includes an administrator device 110*b* and an agent device 110*c*. Like the contacting user device 110*a*, the administrator device 110*b* and agent device 110*c* can be a one of a variety of computing devices, including a smartphone, tablet, smart television, desktop computer, laptop computer, virtual reality device, augmented reality device, or other computing device as described in relation to FIG. 13. Although FIG. 1 illustrates a single agent device 110*c*, in some embodiments the environment can include multiple different agent devices 110*c*, each associated with a different agent user. The agent device 110*c* can receive user input from an agent user and receive information (including communication dialogue, contacting user information, a purpose prediction, and/or an agent transcript) from the server(s) 115.

As shown, the administrator device 110*b* and agent device 110*c* include a client application 113 (i.e., the client applications 113*a* and 113*b*). In particular, the client application 113 may be a web application, a native application installed on the administrator device 110*b* or agent device 110*c* (e.g., a mobile application, a desktop application, etc.), or a cloud-based application where part of the functionality is performed by the server(s). The client application 113 can present or display information to an administrator or agent user, including a user interface for interacting with a contacting user and presenting information pertaining to the contacting user (e.g., contextual information, an agent transcript, etc.). An agent user can interact with the client application 113 to, for example, help a contacting user with a customer service issue. In addition, the administrator can interact with the client application 113 to define EWT points, options, and behavior as described herein.

As illustrated in FIG. 1, the routing system includes a subscriber system 145. The subscriber system 145 may be a service system or a different customer support system. For example, the subscriber system 145 may be a service system that is currently experiencing or exhibiting a problem feature relevant to a contacting user. As another example, the subscriber system 145 may be a service system that is not currently experiencing a problem feature but that a contacting user needs to contact to resolve an issue stemming from a problem feature of a different service system—e.g., an airline system that a contacting user calls to reschedule a flight due to being stuck in traffic. In some embodiments, as indicated by the dashed box of FIG. 1, the agent device 110*c* is associated or affiliated with the subscriber system 145. In these embodiments, the communication management system 125 may provide information such as an electronic communication and contacting user information to the subscriber system 145, whereupon the subscriber system 145 may assign or relay the electronic communication to an agent device 110*c*. In other embodiments, the agent device 110*c* is not directly associated with the subscriber system 145, and the communication management system 125 provides information to the agent device 110*c* without necessarily utilizing the subscriber system 145.

As further illustrated in FIG. 1, the routing system includes the server(s) 115*a* hosting the communication management system 125. The communication management system 145 (e.g., a contact center) may generate, store, process, receive, and transmit electronic data, such as electronic communications, communication dialogue, contacting user information, contextual information, etc. For example, the server(s) 115*a* may receive data from the contacting user device 110*a* in the form of an electronic communication and contacting user information. In addition, the server(s) 115*a* can transmit data to the agent device 110*c* to provide the electronic communication and contacting user information. The server(s) 115*a* can communicate with the contacting user device 110*a*, the agent device 110*c*, the administrator device 110*b*, the CRM system 135, and the subscriber system 145 to transmit and/or receive data via the network 190. In some embodiments, the server(s) 115*a* comprises an application server, a communication server, a web-hosting server, a social networking server, a digital content campaign server, or a digital content management server. Although FIG. 1 depicts the communication management system 125 located on the server(s) 115*a* in some embodiments, the communication management system 125 may be implemented by (e.g., located entirely or in part) on one or more other components of the environment. For example, the communication management system 125 may be implemented by the contacting user device 110*a*, the agent device 110*c*, and/or the subscriber system 145.

Additionally, and as shown in FIG. 1, the routing system includes a server(s) 115*b* hosting a CRM system 135. The CRM system 135 (customer-relationship management system) can compile data from a range of different communication channels, including a company's website, email, and social media. In addition, the CRM system 135 can compile and use data from the communication management system 125, such as data from phone calls, text messages, IMs, email, or other contacting user communications.

In some embodiments, though not illustrated in FIG. 1, the routing system may have a different arrangement of components and/or may have a different number or set of components altogether. For example, the contacting user device 110*a*, the agent device 110*c*, the administrator device 110*b*, the CRM system 135, and the subscriber system 145 may communicate directly with the communication management system 125, bypassing the network 190. The communication management system 125 can be implemented in a variety of different ways across the server(s) 115, the network 190, the agent device 110*c*, the contacting user device 110*a*, and the subscriber system 145. Additional detail regarding implementing different components of the communication management system 125 across devices is provided below.

Figure 2:
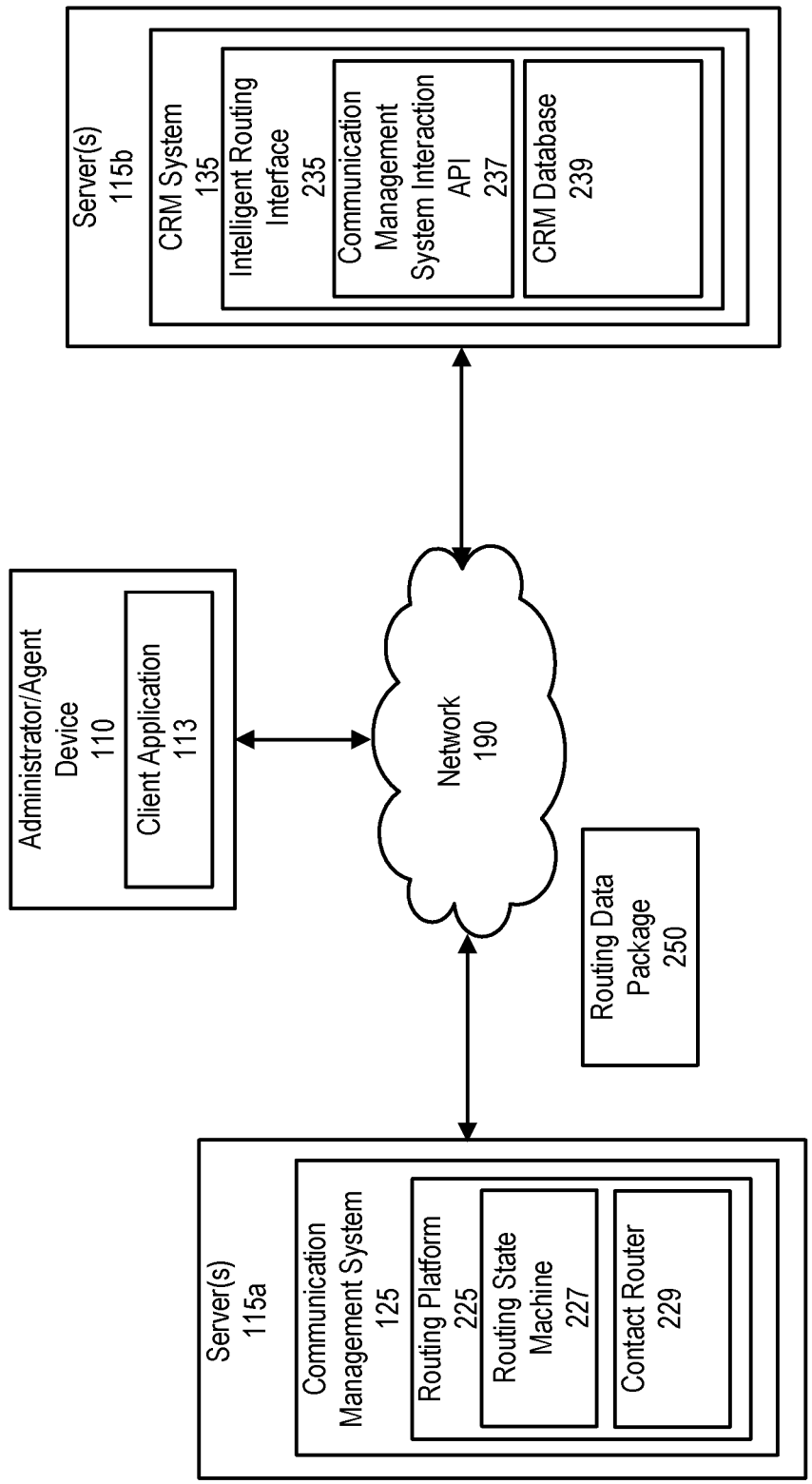
FIG. 2 illustrates additional details of a routing system in accordance with one or more embodiments.

As mentioned above, the routing system can provide an intelligent routing interface within the CRM system 135 that a user can setup routing (e.g., call routing) within the communication management system 125 (e.g., contact center) using data within the CRM system 135. To that end, FIG. 2 illustrates an example routing system that includes the communication management system 125, the CRM system 135, and an administrator and/or agent device 110. As shown in FIG. 2, the CRM system 135 includes an intelligent routing interface 235 that the administrator and/or agent device 110 can access to define routing flows that are then synchronized to the communication management system 125. For example, the intelligent routing interface 235 can include a communication management system interaction API 237 to allow the CRM system 135 to package a routing flow and communicate the routing flow to the communication management system 125.

For example, an agent, via the agent device 110c, can access a graphical user interface for the intelligent routing interface 235 that allows the agent to select a routing flow for a contacting user based on a particular CRM object (with associated CRM data). Based on the selection, the intelligent routing interface 235 performs a data dip, or otherwise access CRM data associated with the particular CRM object from a CRM database 239. The intelligent routing interface 235 generates a routing data package 250 that includes the contacting user information, the routing flow definitions, and the CRM data (e.g., names and contact information of agents and/or ring groups) and sends the package using the interaction API to communication management system 125.

As further shown in FIG. 2, the communication management system 125 includes a routing platform 225 that has a routing state machine 227 and a contact router 229. Upon receiving the routing data package 250, the routing platform 225 updates the routing state machine 227 based on the routing data within the routing data package 250. The routing state machine 227 keeps the routing configurations current without conflict. Thus, after performing a conflict check to ensure there is not already a routing record associated with the contacting user, the routing state machine 227 activates the routing flow within the routing state machine 227. Once activated, the communication management system 125 uses the contact router 229 within the routing platform 225 to route any future communication from the contacting user per the routing flow defined above using the intelligent routing interface within the CRM system 135.

Figure 3A:
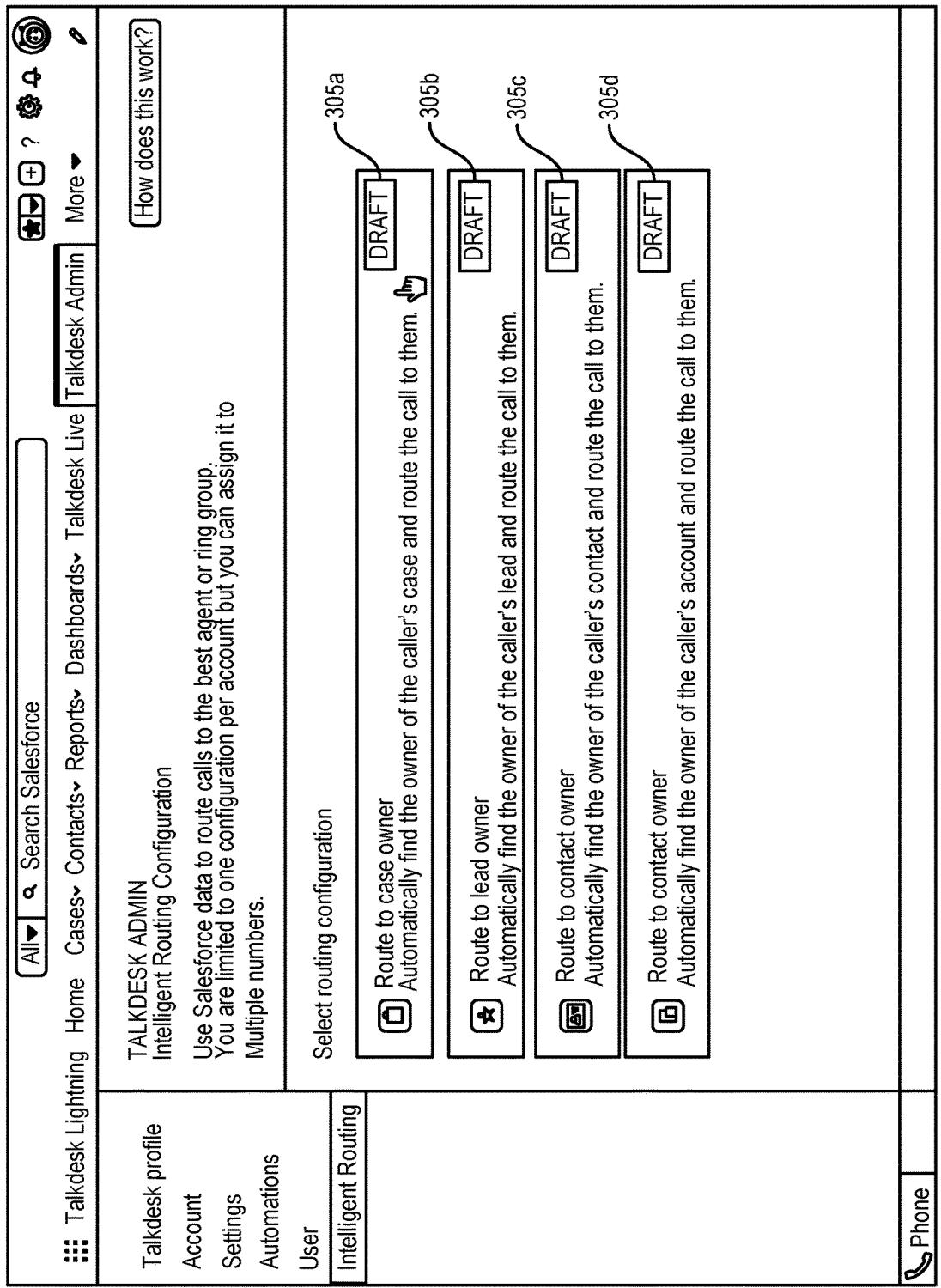
FIGS. 3A-3F illustrate example graphical user interfaces that the routing system provides within a CRM interface to setup call routing in a communication management system in accordance with one or more embodiments.

FIGS. 3A-3F illustrate example graphical user interfaces that the routing system provides through the intelligent routing interface within the CRM system, described above with respect to FIG. 2. The graphical user interfaces illustrate selectable options that an agent or administrator can select via the agent/administrator device to define a routing flow for a contacting user. As shown in FIG. 3A, the routing system provides a graphical user interface that includes a list of routing configurations 305 (e.g., routing flows 305). As illustrated, each of the routing configurations 305 is based on a different CRM object within the CRM system. For example, the listed routing configurations include a routing configuration 305a "Route to case owner," a routing configuration 305b "Route to lead owner," a routing configuration 305c "Route to contact owner," and a routing configuration 305d "Route to account owner." The terms "case owner," "lead owner," "contact owner," and "account owner" are all different types of CRM objects that are associated with different CRM data within the CRM database 239. For example, the case owner is a CRM object that is associated with an agent is that assigned to a particular case within the CRM system 135. The CRM object for the case owner is further associated with the agent's phone number extension, chat handle, or other contacting information. Moreover, the CRM object of the case may also be associated with ring group (a group of agents and their contact information) that are assigned to a department associated with the case. Thus, by using the CRM object to create a data flow, the routing system can perform a data dip into the CRM database 239 to easily and quickly gather the data needed to setup a routing configuration in just a matter of seconds, as will be further explained as we continue through the figures.

Figure 3B:

For instance, FIG. 3B illustrates that the agent selects the routing configuration 305a "Route to case owner." Upon making the selection, the routing system updates the GUI to show a preconfigured routing flow that is defined for the "Route to case owner" scenario. As shown, the preconfigured routing flow provides a series of if statements that are executed in order to route a communication from the contacting user. As illustrated, in the "Route to case owner" scenario, the contact router 229 (see FIG. 2) would first "select the most recent case from the last 7 days" associated with the contacting user and then route to the case owner associated with that case. Then, and as further illustrated, "if the case owner is found but unavailable or no case is found, route to Agents."

As illustrated in FIG. 3B, each of the underlined words are selectable links that allows an agent/administrator to update the definitions of the flow. For example, instead of "most recent" case, the agent/administrator can select "any case." Or, instead of the time period of the "last 7 days" the agent/administer can change that to the last month, quarter, year, or any other time period. Similarly, the agent/administrator can define the status of the case and/or the priority of the case, as illustrated in FIG. 3B. Finally, the second if statement allows the agent/administrator to define where the communication should go if the case owner is not available or if no matching case is found. For example, the communication can be generally routed to any agent, or it could be routed to a specific ring group or specific agent.

Figure 3C:
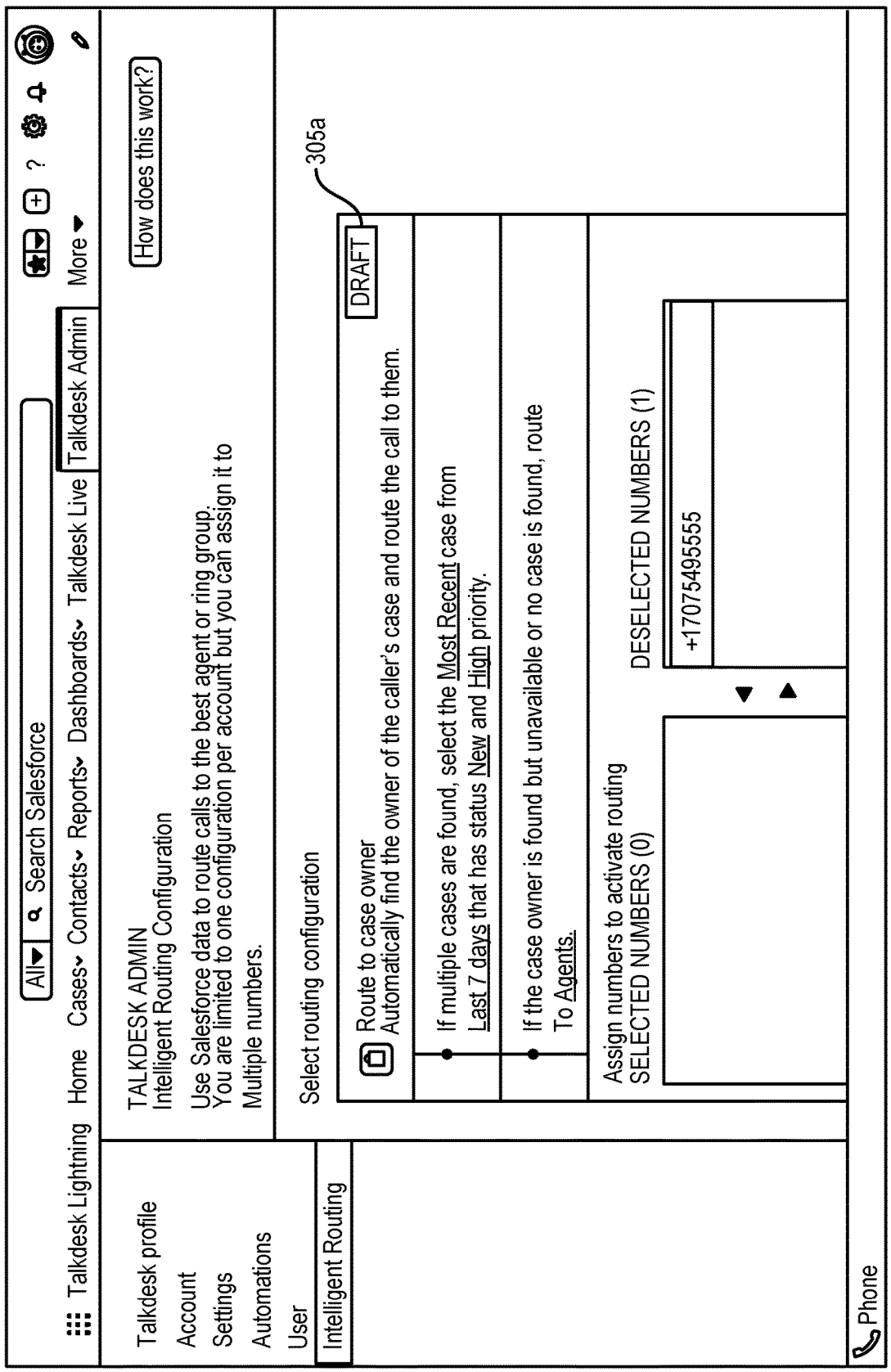
Figure 3D:
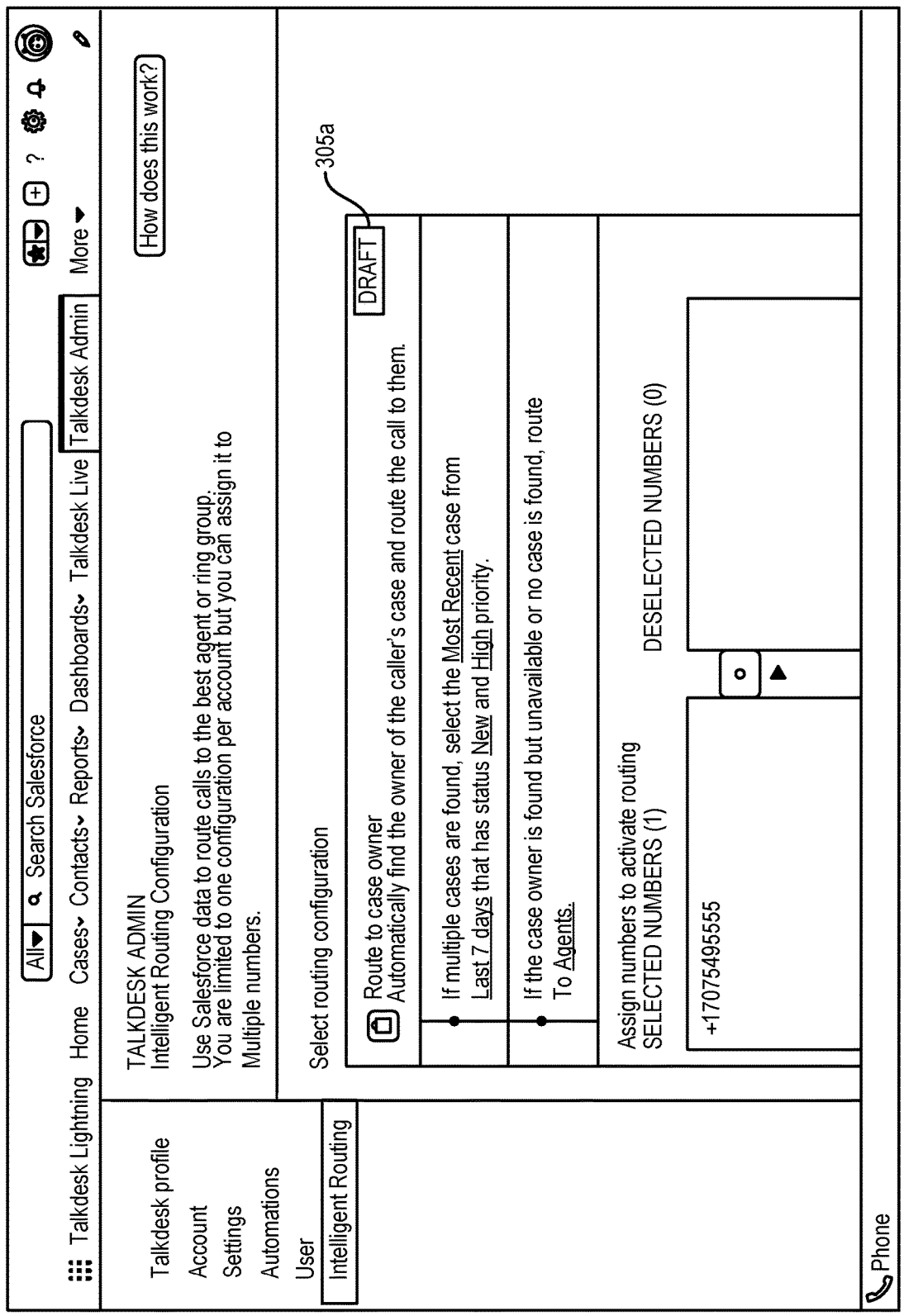
Figure 3E:
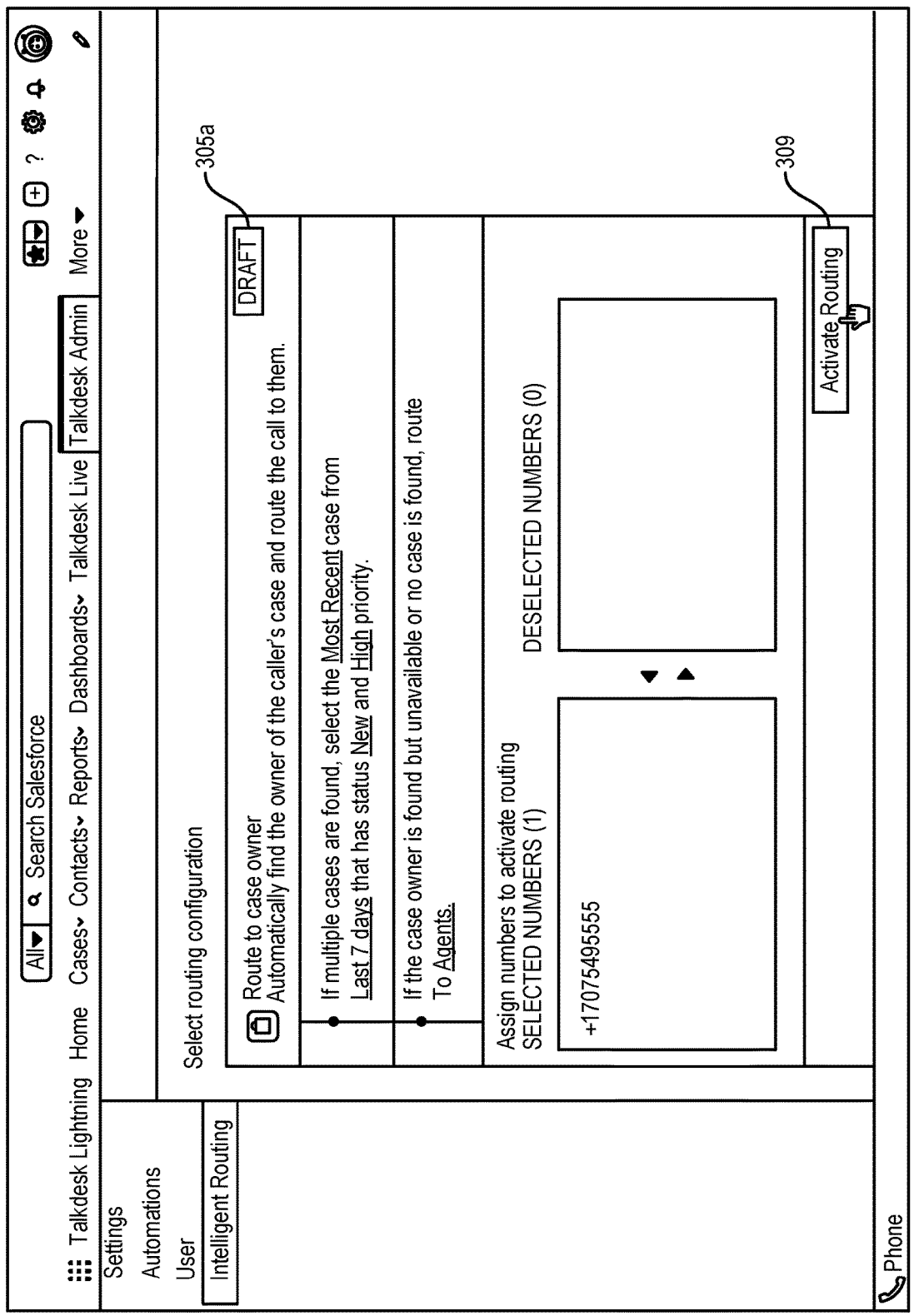
Figure 3F:
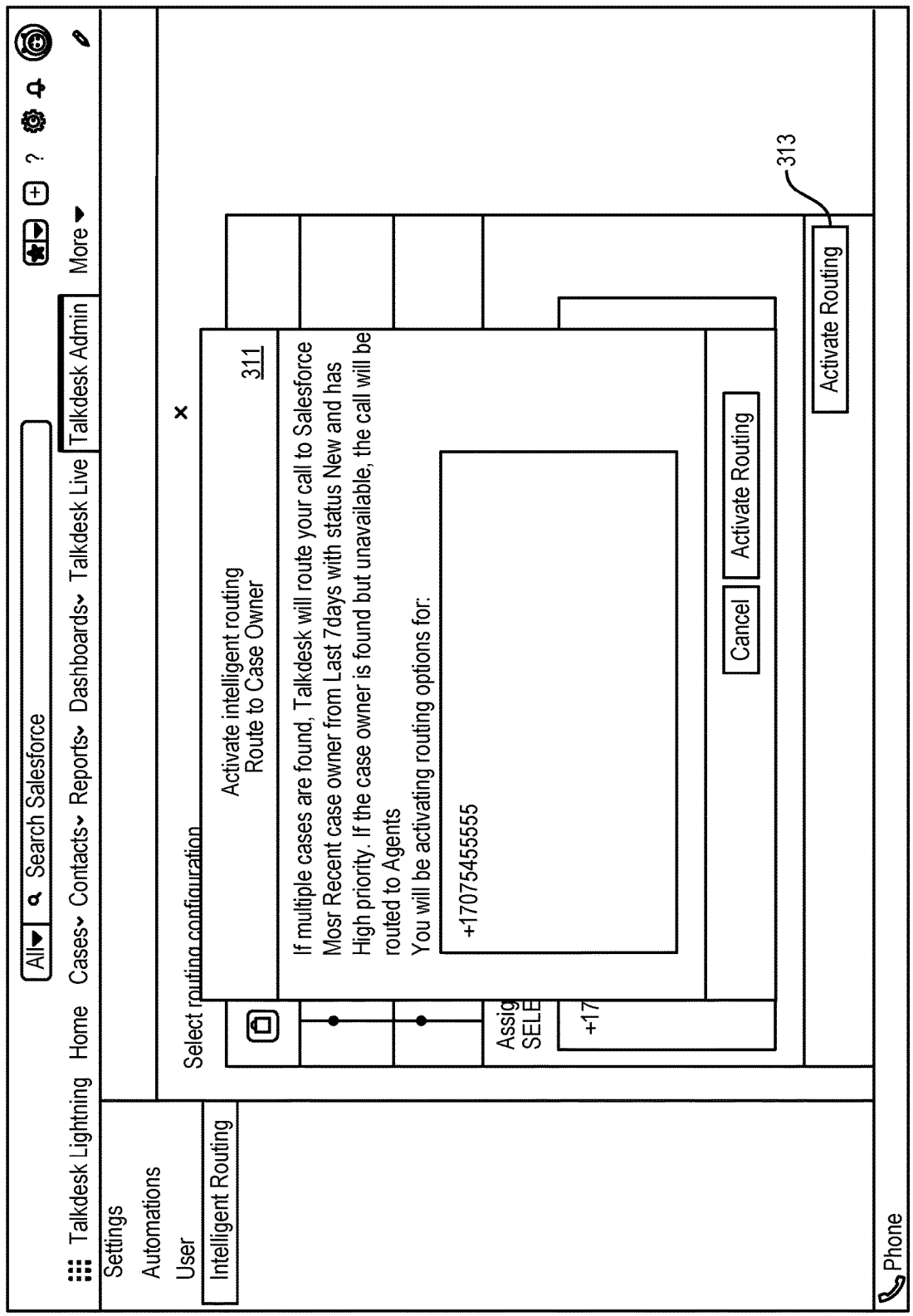

Once the routing configuration is defined, the routing system provides an interface to assign contacting users to the routing configuration. As shown in FIG. 3C, the routing system can provide a list of phone numbers that are not assigned to the routing configuration, allow the agent/admin to select one or more numbers associated with contacting users, and move the numbers from the "deselected number" box to the "selected number" box by selecting the arrow as shown in FIG. 3D. Once the agent/admin selects one or more numbers, the routing system updates the GUI to include an "Activate Routing" option 309. Upon selection of this option 309, the routing system further provides a confirmation page 311 that summarizes the routing configuration and provides an option to confirm and activate the routing configuration, as illustrated in FIG. 3F.

Upon selection of the "Activate Routing" option 313 on the confirmation screen 311, the routing system causes the intelligent routing interface 235 to perform a data dip into the CRM database 239 based on the CRM object of case owner to access and collect the needed agent information for the routing configuration. The intelligent routing interface 235 then generates a data package with the routing configuration and related CRM data (agent information) and sends the data package 250 to the communication management system 125 to update the routing state machine 227 in the routing platform 225, as described above with respect to FIG. 2.

Figure 4A:
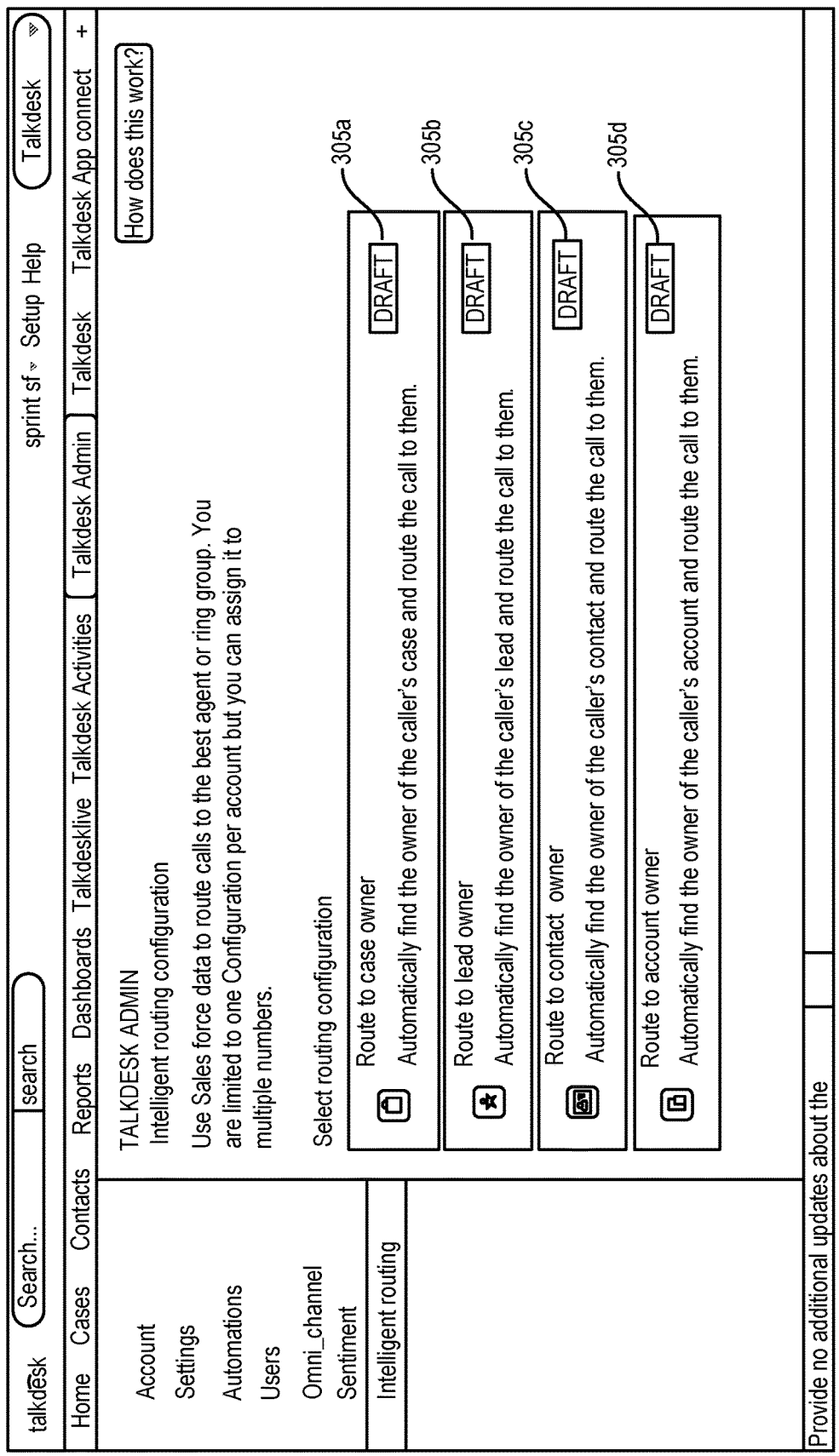
FIGS. 4A-4E illustrate example graphical user interfaces that the routing system provides within a CRM interface to setup call routing in a communication management system in accordance with one or more embodiments.
Figure 4B:
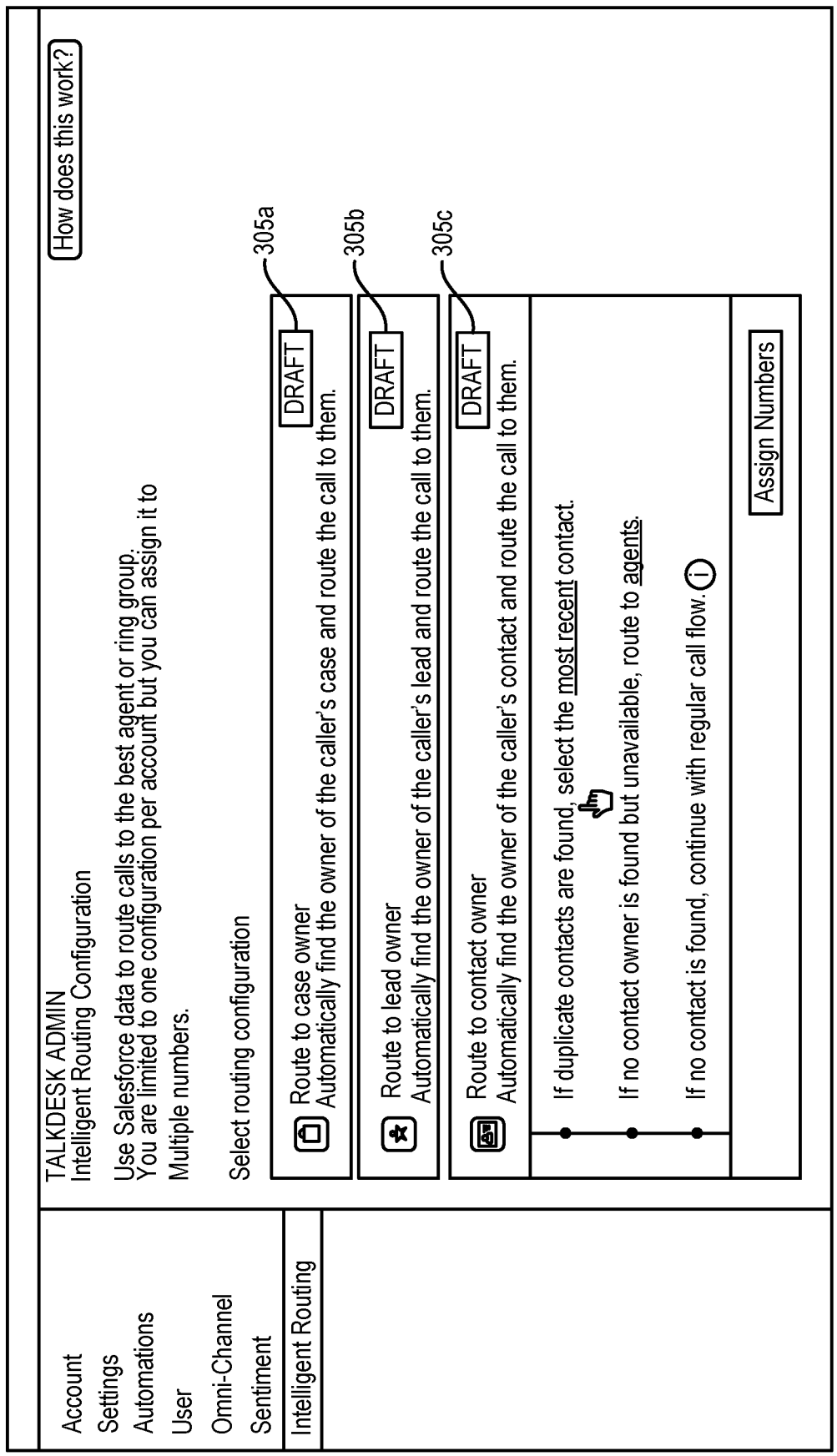
Figure 4C:
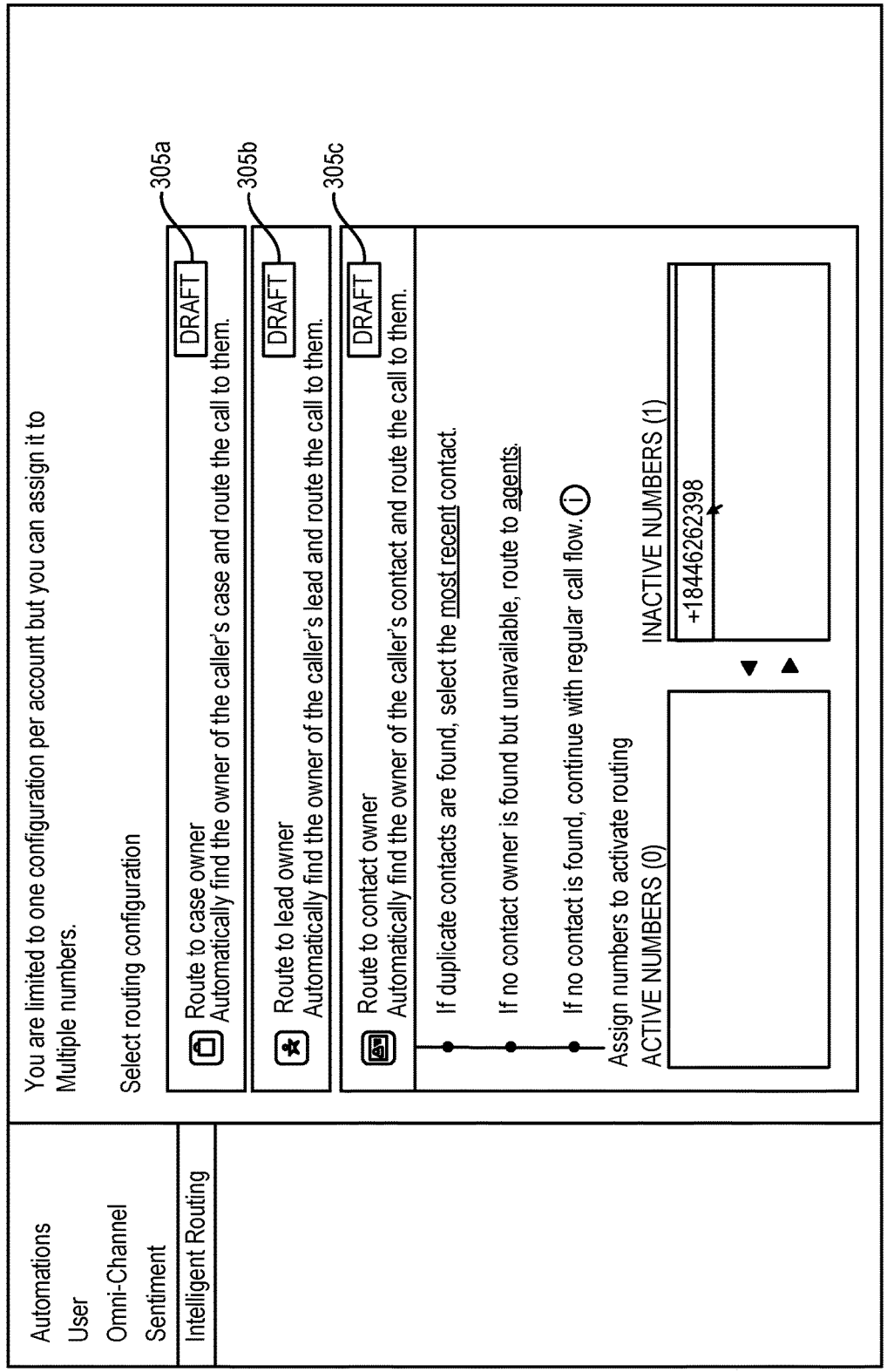
Figure 4D:
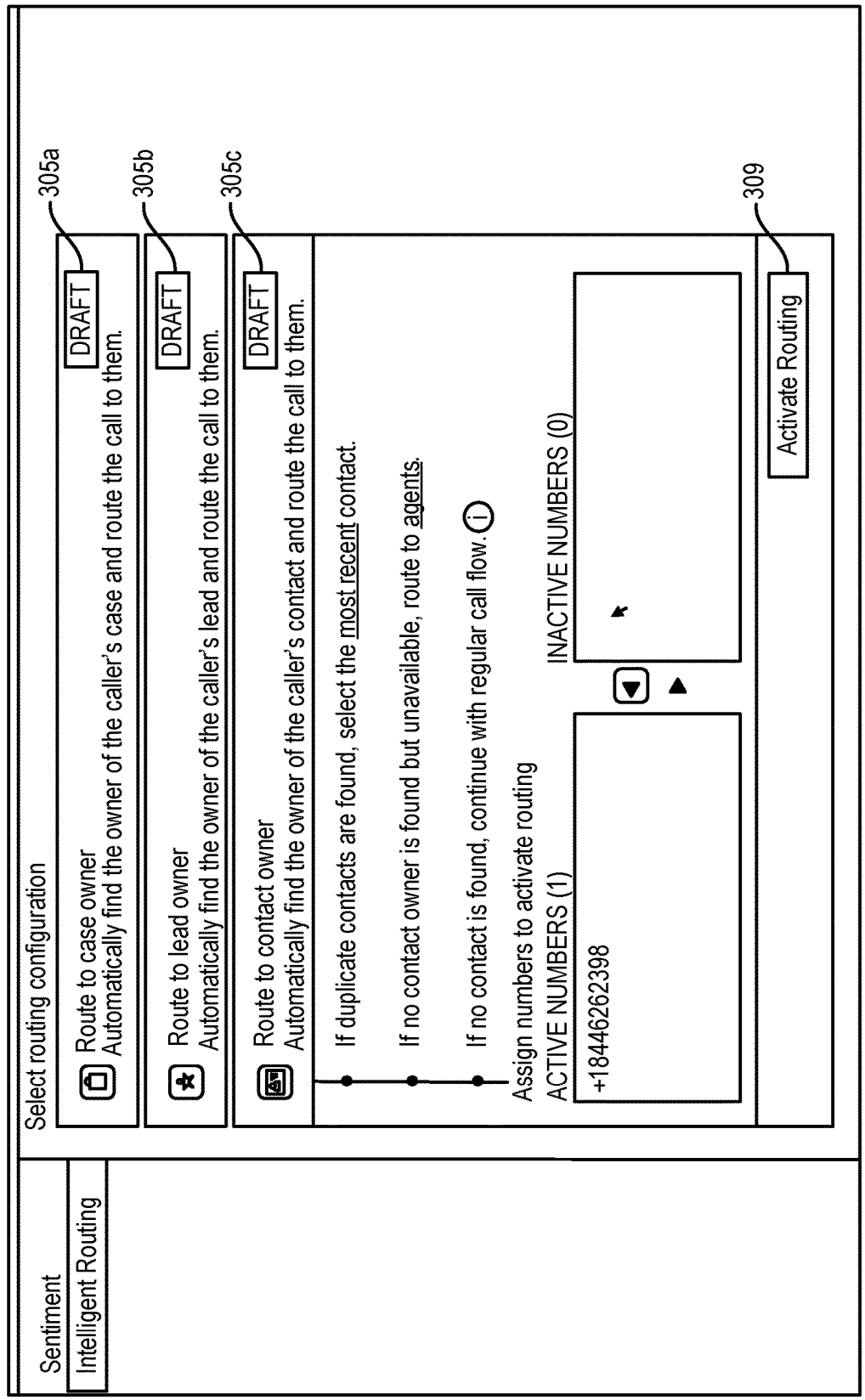
Figure 4E:
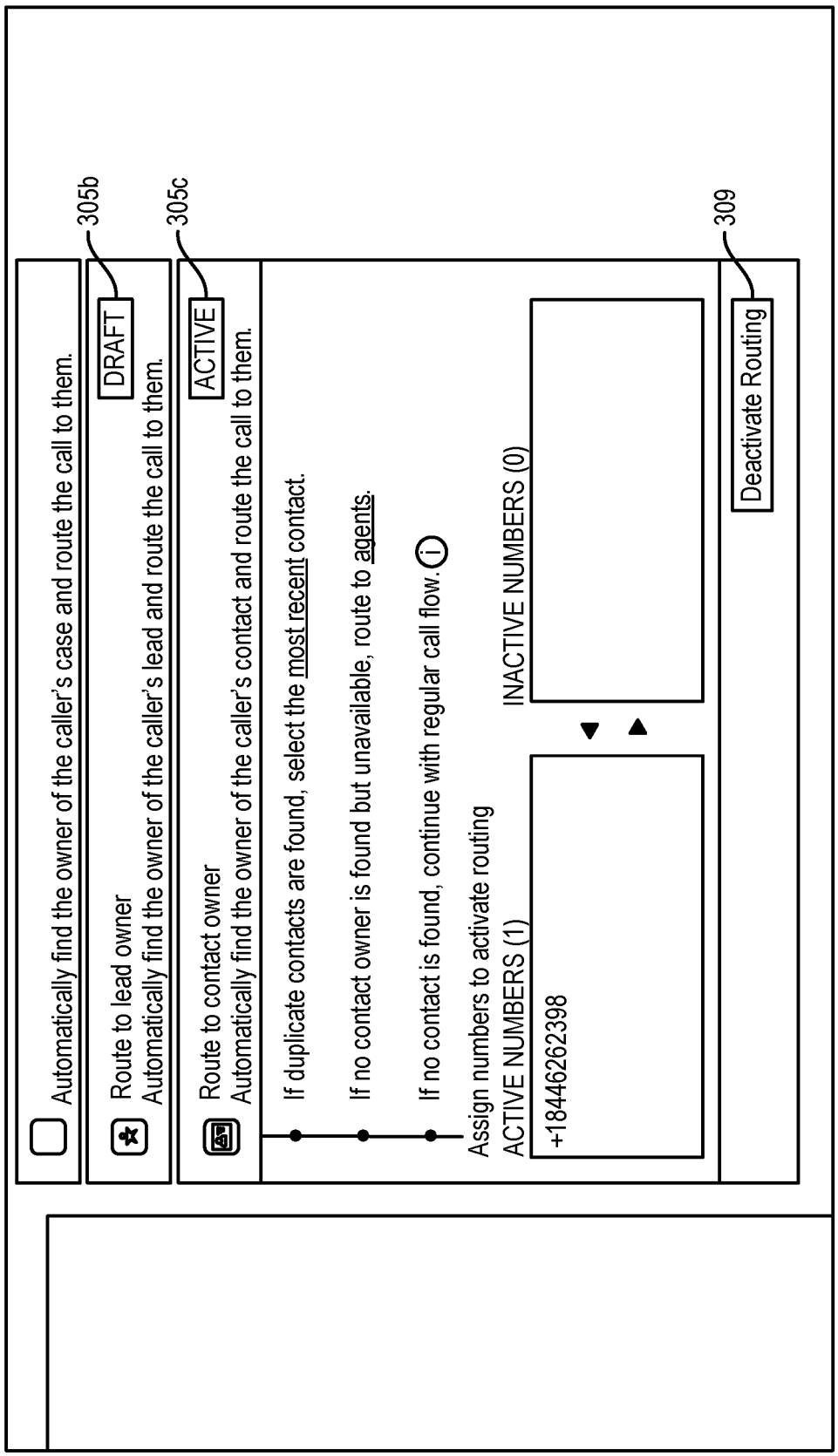

FIGS. 4A-4E illustrate another example of the routing system generating a routing flow or routing configuration based on another type of CRM object. As shown in FIG. 4A-4B, the agent/admin can select the routing configuration 305c of "Route to contact owner." Again, based on the selection the routing system provides an updated GUI that shows a preconfigured routing configuration that, in this case, comprises three if statements to be performed in succession. For instance, the preconfigured flow first checks to see if there are duplicate contacts, and if so, selects the most recent contact and then routes the call to the contact owner associated with that contact. Again, the "most recent" setting can be changed by the agent/admin selecting the most recent terms within the GUI. Next, the routing configuration defines that if the contact owner is not available, then to route to "agents," where the group of agents can be defined. Finally, the routing configuration indicates that if no contact owner is found, the continue with a regular or default call flow. As explained with respect to FIGS. 3C-3F, FIGS. 4C-4E allows the agent/admin to select contacting users (e.g., phone numbers) to assign to the routing configuration and activate the routing configuration by sending a routing package 250 to the communication management system 125 as described above.

Figure 5:
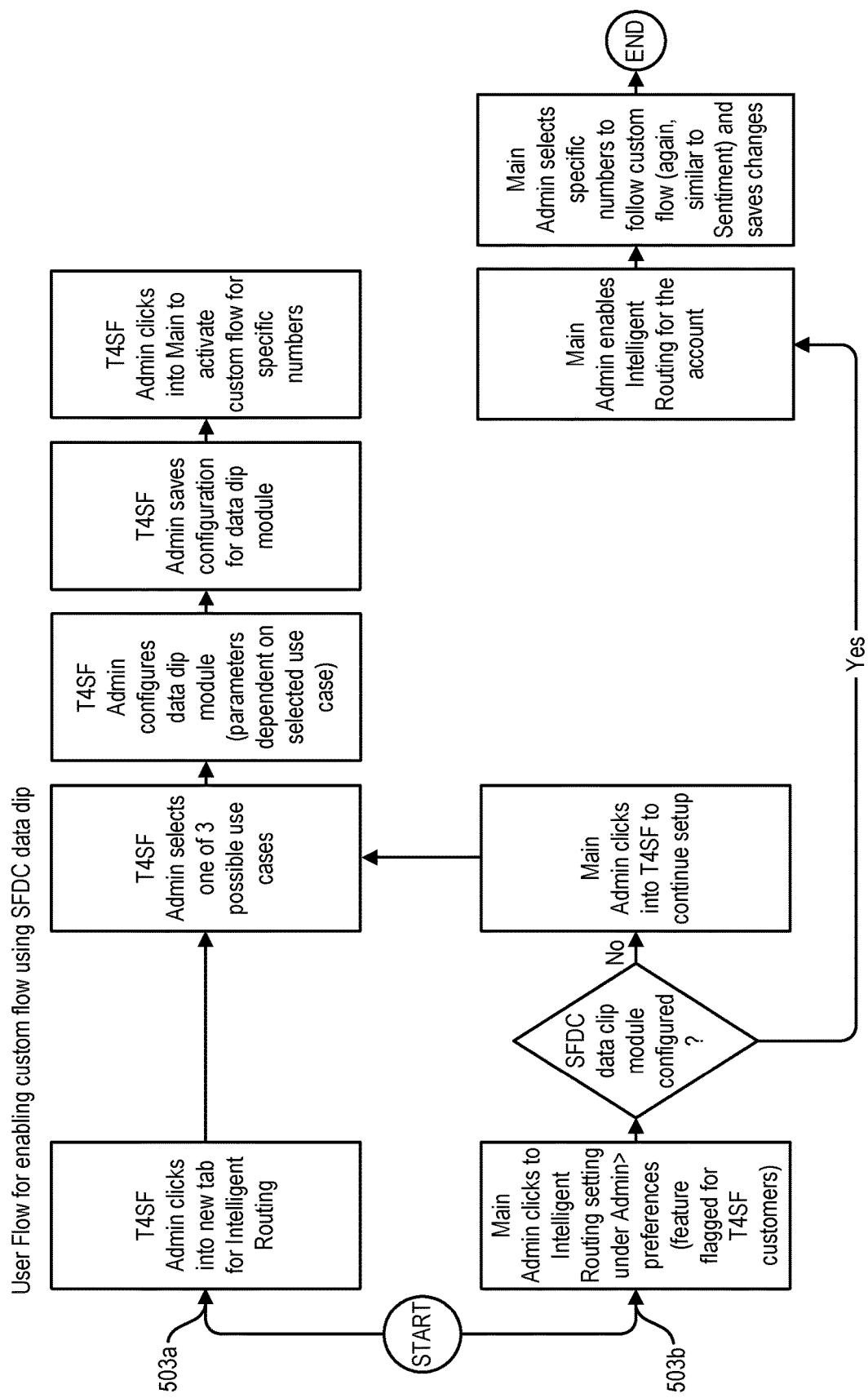
FIG. 5 illustrates an example sequence flow for setting a new routing within the routing system.

FIG. 5 illustrates a user flow for enabling custom flow using CRM data dip as described above. For purposes of explanation, the T4SF indicates the intelligent routing interface within the CRM system. As illustrated, in some embodiments there can be multiple paths for an agent/admin to set up a routing flow. In a first path 503a, the user selects the intelligent routing interface as shown above with respect to FIGS. 3A-4E. Following that path the agent/admin selects a routing configuration option, and then, configures data dip parameters that are dependent on the selected routing configuration. The agent/admin then saves configuration to be used in the data dip and proceeds to assign numbers and active custom flow for the assigned numbers.

On a second path 503b, an admin may select under a preferences menu an option to configure intelligent routing. At this phase, the intelligent routing interface determines if there is already a configured data dip. If there is no configured data dip, then the user flow progresses to the normal setup described in the preceding paragraph. If there is a configured data dip, then the admin can proceed directly to enabling the intelligent routing for the account, assigning specific numbers to follow the custom flow, and save changes to activate the flow.

Figure 6:
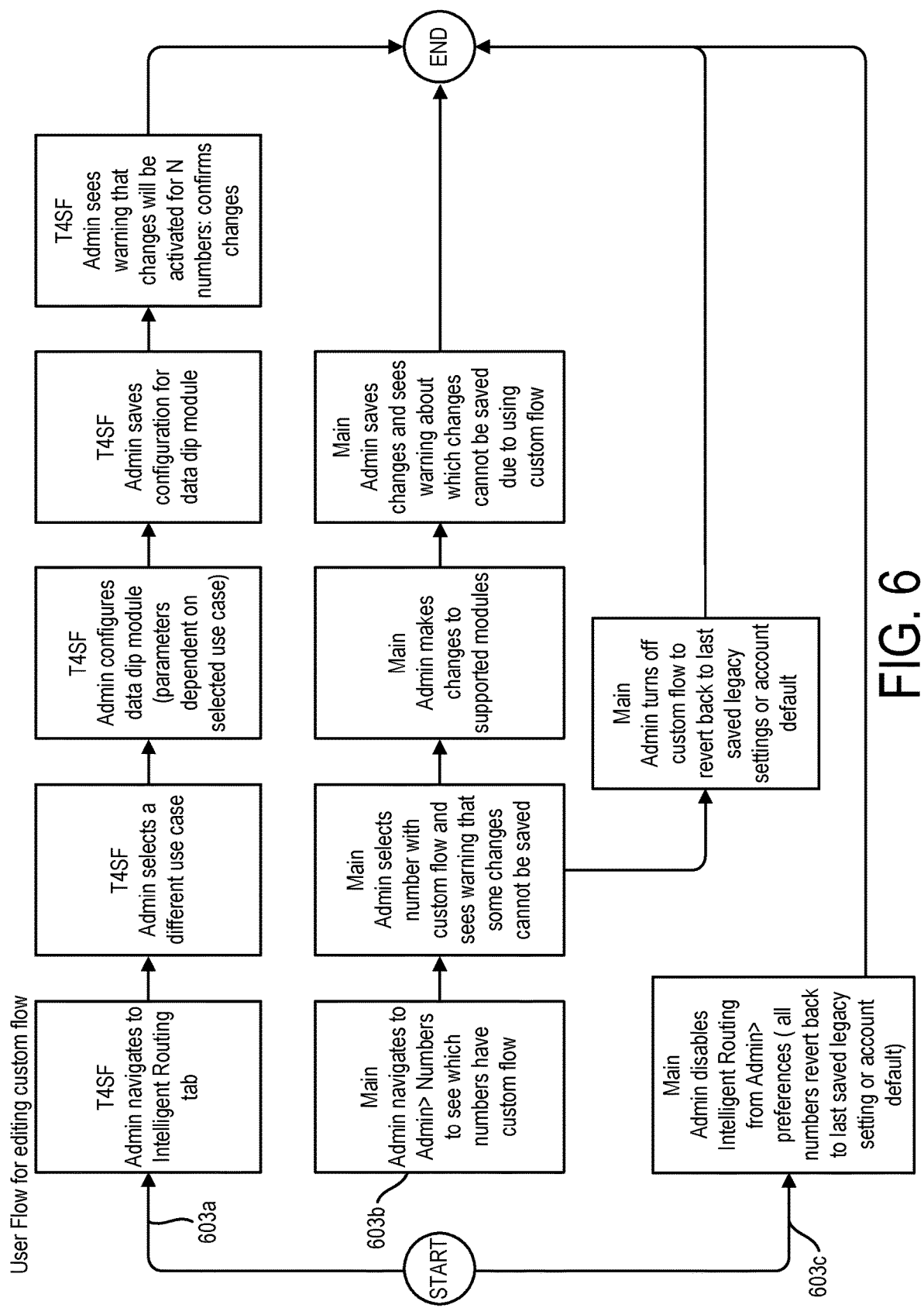
FIG. 6 illustrates an example sequence flow for editing a routing within the routing system.

FIG. 6 illustrates a user flow for editing or deactivating a custom flow using CRM data dip as described above. In one user flow 603a, the admin/agent may attempt to create a routing flow for a contact that is already assigned to a routing flow. In this case, the intelligent routing system provides a warning that the requested changes affect previously assigned numbers. After confirming the change, the intelligent routing interface sends a routing package to the communication management system and the state machine is updated with the most recent flow for the contacting user. The routing system can provide a similar flow 603b, but from a different entry point. For example, the routing system can cause the intelligent routing interface to provide contacting user numbers that have an existing routing flow. The intelligent routing interface can then provide options for editing the routing flow, including providing warnings or messages to avoid conflicts. In addition, the intelligent routing interface can provide a flow 603c option to deactivate a routing flow and return to the last saved legacy settings or account default.

Figure 7:
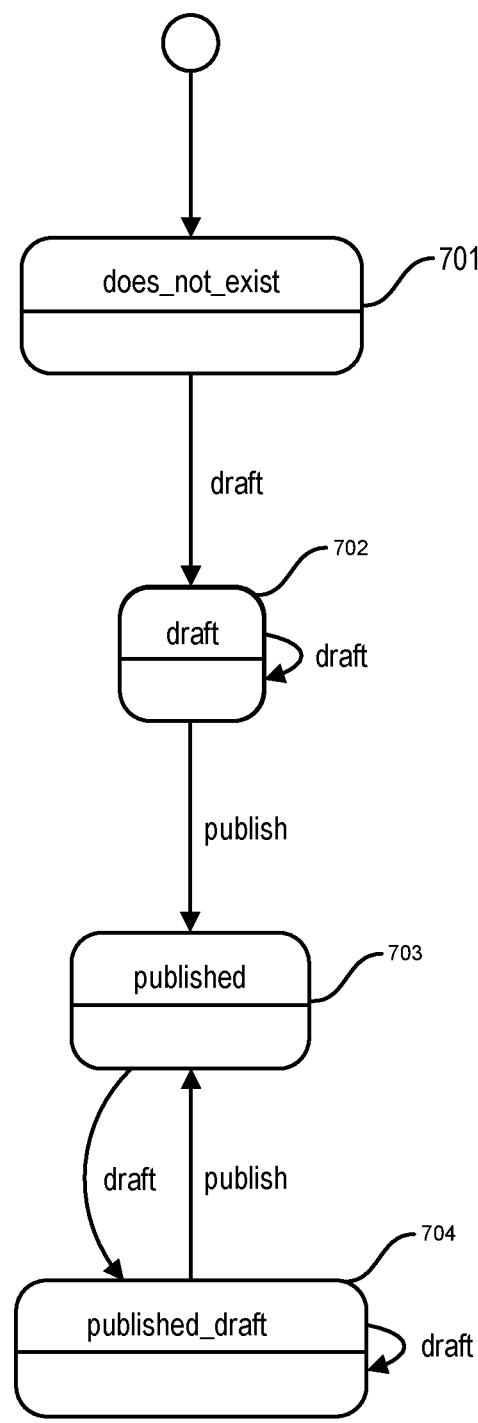
FIG. 7 illustrates and example sequence flow to publish to a state machine in accordance within one or more embodiments.
Figure 8:
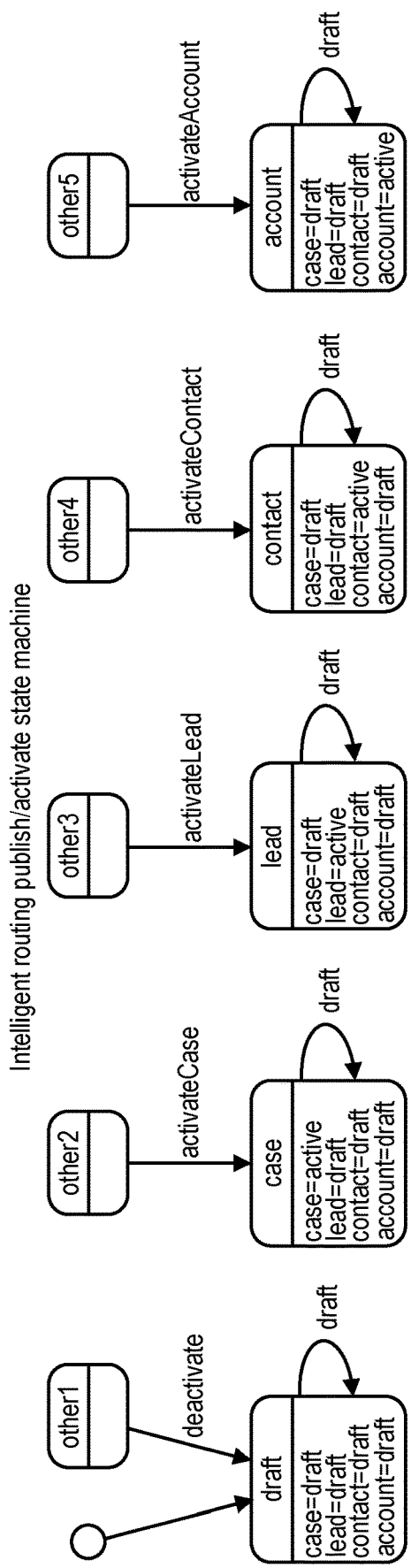
FIG. 8 illustrates example draft flow options in accordance with one or more embodiments.
Figure 9:
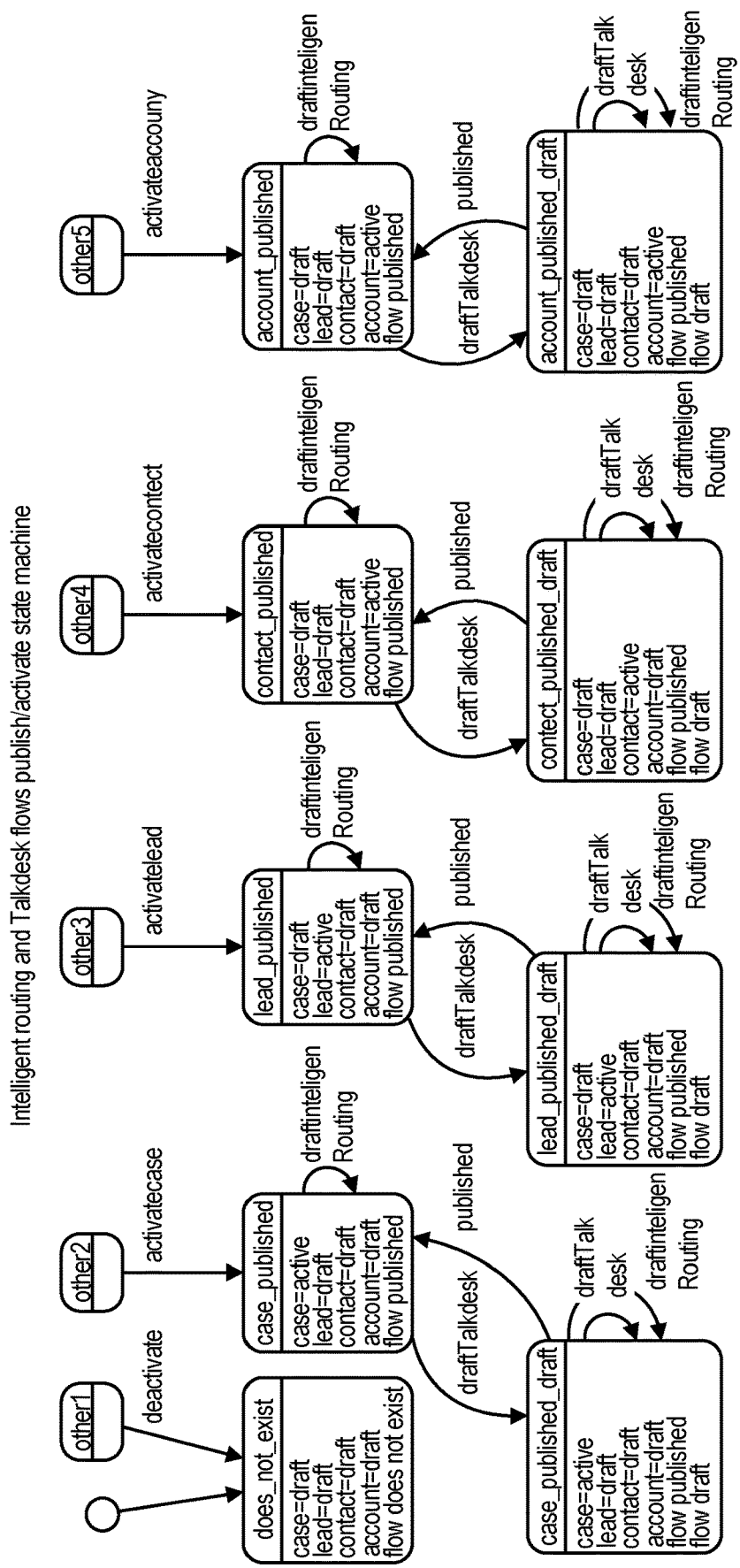
FIG. 9 illustrates synchronizing draft flows with a state machine in accordance with one or more embodiments.

FIGS. 7-9 illustrate the interaction between the intelligent routing interface within the CRM system and the state machine within the communication management system that the routing system utilizes to ensure the routing flows within the CRM system and the communication management system are synchronized. In general, there are two states for a routing configuration: draft or active (e.g., published). As shown in FIG. 7, initially at 701 no flow configurations exist. However, the routing system can allow an admin/agent to draft a routing flow (as descried above), and as shown in 702. The draft phase allows the admin/agent to review and customize parameters of a routing flow before making it active. Once the admin/agent is satisfied with the routing flow parameters, the admin/agent can activate the routing flow, or in other words, publish the routing flow as illustrated in 703. Once published, the routing flow is listed as active within the state machine in the communication management system. As FIG. 7 further indicates, an admin/agent can edit a published routing flow to create a published draft at 704, and then re-publish to update the routing flow at 705. Note, the routing flow can be edited on via the intelligent routing interface within the CRM system or from within a routing configuration interface within the contact management system. The draft/activate or publish system ensures that there never is a conflicting routing configuration for a particular contacting user because the drafting phase allows for editing and changing of parameters on one system without activating those parameters until the admin/agent selects the option to activate, thereby updating the state machine in the communication management system.

FIG. 8 illustrates the various routing configurations (e.g., other1, other2, other 3, other4, and other5) as described above with respect to FIGS. 3A-4E. As shown, the other2 illustrates the routing flow is activated based on case owner, other3 indicates that the routing flow is activated based on lead owner, other4 indicates that the routing flow is activated based on contact owner, and other5 indicates that the routing flow is activated based on account owner. Only one type of routing flow can be activated at a time, with all other types of routing flows indicated in "draft," which means they are deactivated. Further, FIG. 8 illustrates other1 that shows that a routing configuration can be deactivated by changing all routing flow types to draft.

FIG. 9 illustrates the various routing configurations (e.g., other1, other2, other 3, other4, and other5) as described above with respect to FIGS. 3A-4E, but further illustrates how the user can create and/or edit routing flows within the CRM system (draftintelligentrouting) or within the communication management system (draftinTalkdesk). Accordingly, the routing system allows admins/agents to create and edit routing flows within the CRM system easily and efficiently and with ensuring that the routing flows in the CRM system do not conflict with the routing flows defined in the communication management system.

Figure 10:
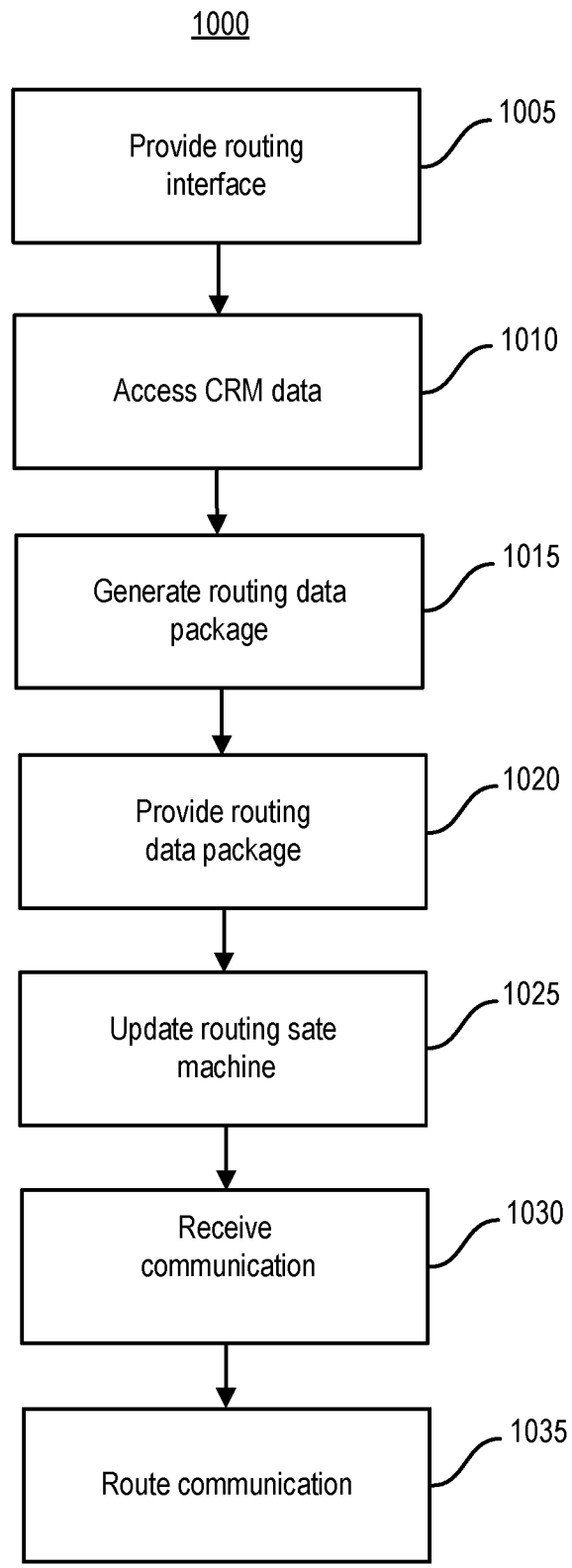
FIG. 10 illustrates an example method for updating a routing state machine and for routing a communication using the routing state machine.

FIG. 10 is an illustration of an example method 1000 for updating a routing state machine and for routing a communication using the routing state machine. The method 1000 may be implemented by one or more of a CRM system or a communication management system.

At 1005, a routing interface is provided. The routing interface 235 may be provided by the CRM system 135. The routing interface 235 may allow a user to define routing parameters for a communication from a contacting user.

At 1010, CRM data is accessed based on the routing parameters. The CRM data may be accessed by the CRM system 135 from the CRM database 239. The CRM data may include agent numbers and ring groups.

At 1015, a routing data package is generated. The routing package 259 may be generated by the CRM system 135. The routing data package 250 may be generated by the CRM system 135 from the routing parameters.

At 1020, the routing data package is provided. The routing data package may be provided by the CRM system 135 to the communication management system 125 through the network 109.

At 1025, the communication management system is caused to update a routing state machine. The communication management system 125 may be caused to update the routing state machine 227 by the CRM system 135.

At 1030, a communication is received from the contacting user. The communication may be received by the communication management system 125.

At 1035, the communication is routed according to the routing state machine. The communication may be routed by the communication management system 125 using the routing state machine 227.

Figure 11:
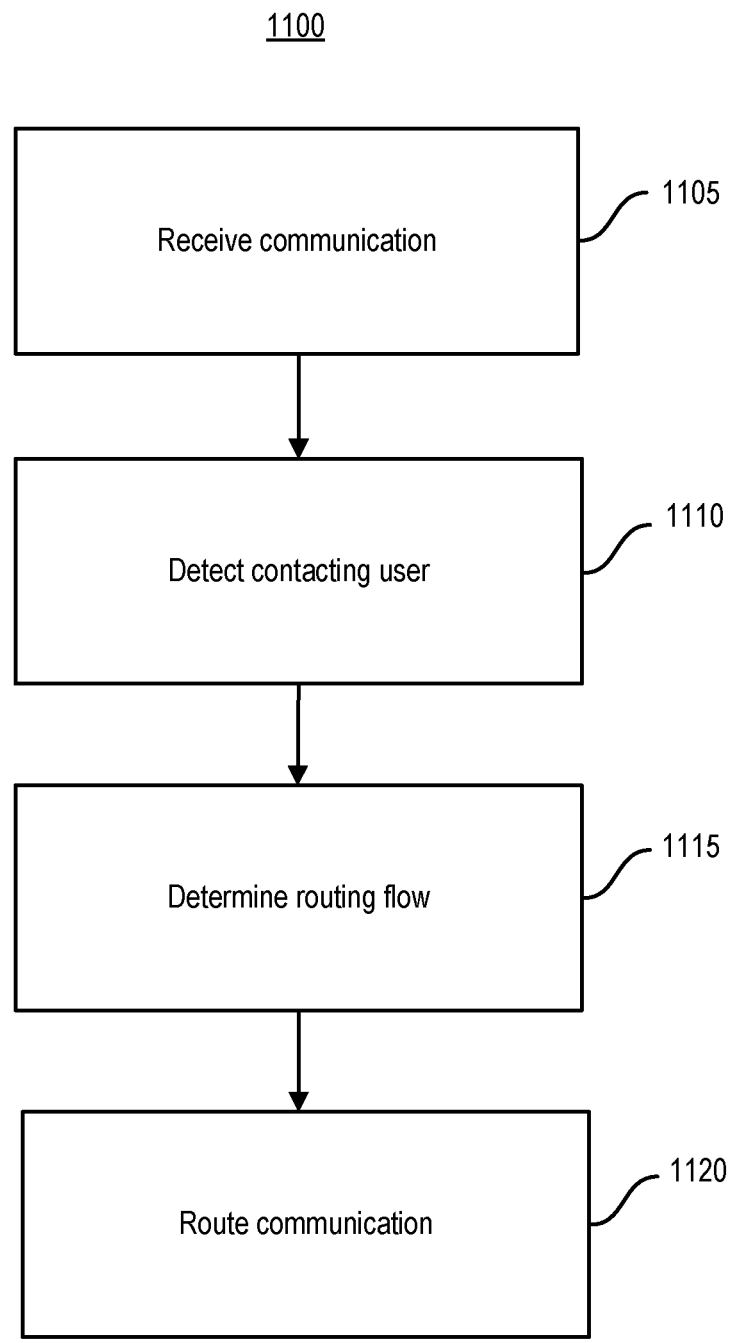
FIG. 11 illustrates an example method for receiving a communication and for routing the communication using the routing state machine.

FIG. 11 is an illustration of an example method 1100 for receiving a communication and for routing the communication using the routing state machine. The method 1100 may be implemented by a communication management system.

At 1105, a communication is received from a contacting user. The communication may be received by the communication management system 125. The communication may be a call, text, email, etc.

At 1110, the contacting user associated with the communication may be detected. The contacting user may be detected by the communication management system 125. For example, if the communication is a call, the communication management system 125 may determine the contacting user by matching the phone number of the call to the contacting user.

At 1115, a routing flow defined for the contacting user is determined. The routing flow may be determined by the communication management system 125. The routing flow may identify one or more agent numbers or ring groups, for example. The routing flow may be part of a routing state machine.

At 1120, the communication is routed based on the routing flow. The communication may be routed by the communication management system 125 to the agent or ring group identified by the routing flow.

Figure 12:
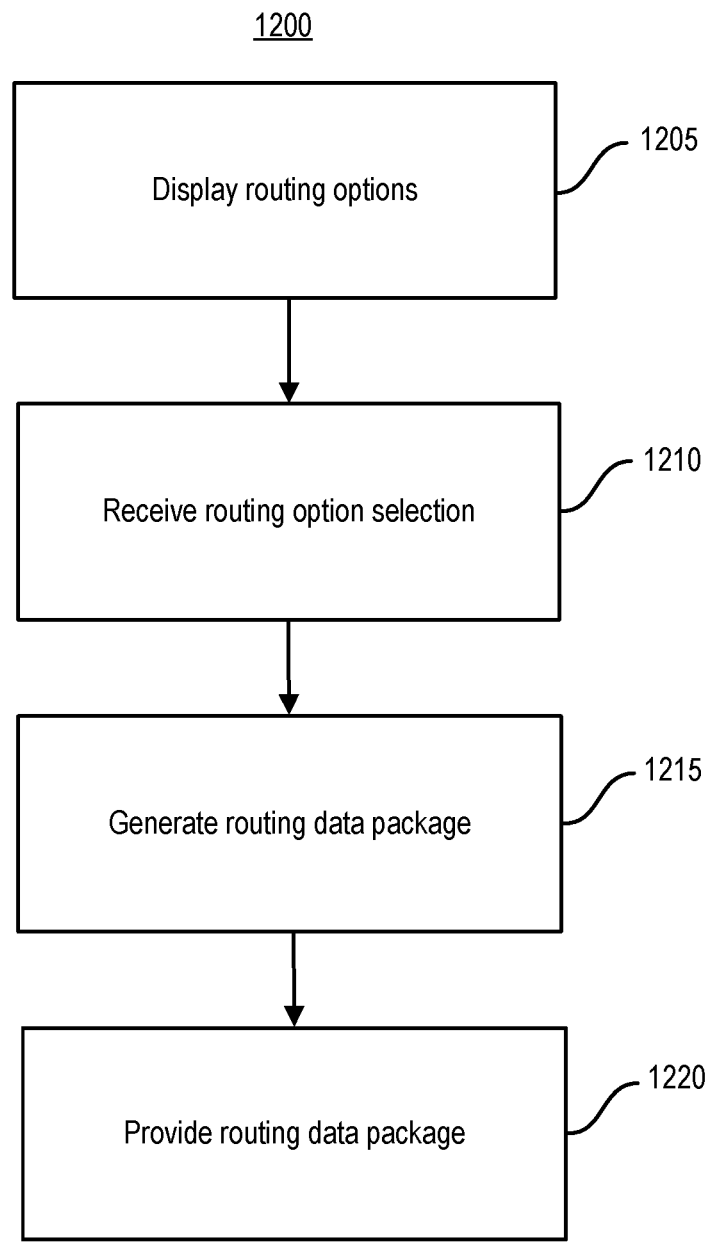
FIG. 12 is an illustration of an example method for generating a routing data package.

FIG. 12 is an illustration of an example method 1200 for generating a routing data package. The method 1200 may be implemented by a CRM system.

At 1205, a plurality of routing options is displayed for a data object. The plurality of data objects may be displayed to an administrator in a intelligent routing interface 235 by the CRM system 135. The data object may be a customer relationship defined in the CRM system 135 such as a customer or contact.

At 1210, a selection of a routing option of the plurality or routing options is received. The selection may be received by the CRM system 135 through the intelligent routing interface 235.

At 1215, a routing data package is generated. The routing data package is generated by the CRM system 135 based on the selected routing option.

At 1220, the generated routing data package is provided. The routing data package 250 may be provided by the CRM system 135 to the communication management system 125 through the network 190.

Figure 13:
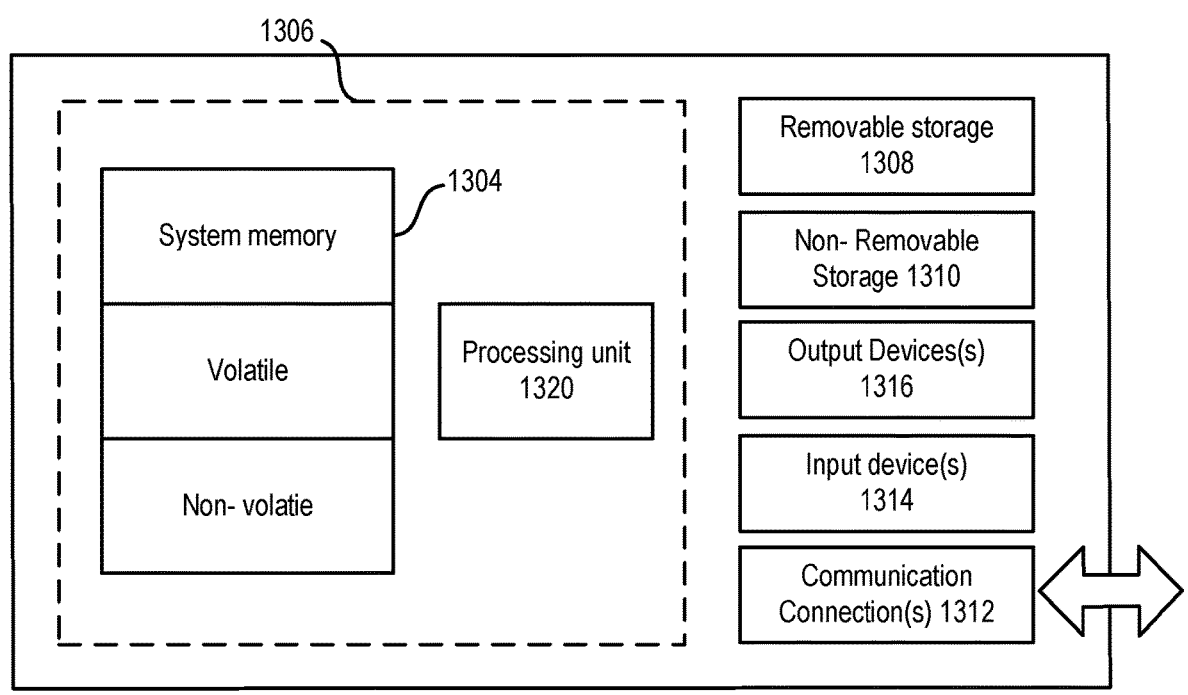
FIG. 13 is an illustration of an example computing device.

FIG. 13 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), mini-computers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 13, an exemplary system for implementing aspects described herein includes a computing device, such as computing device 1300. In its most basic configuration, computing device 1300 typically includes at least one processing unit 1302 and memory 1304. Depending on the exact configuration and type of computing device, memory 204 may be volatile (such as random access memory (RAM)), non-volatile (such as read-only memory (ROM), flash memory, etc.), or some combination of the two. This most basic configuration is illustrated in FIG. 13 by dashed line 1306.

Computing device 1300 may have additional features/functionality. For example, computing device 1300 may include additional storage (removable and/or non-removable) including, but not limited to, magnetic or optical disks or tape. Such additional storage is illustrated in FIG. 13 by removable storage 1308 and non-removable storage 1310.

Computing device 1300 typically includes a variety of tangible computer readable media. Computer readable media can be any available tangible media that can be accessed by device 1300 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 1304, removable storage 1308, and non-removable storage 1310 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media may be part of computing device 1300.

Computing device 1300 may contain communications connection(s) 1312 that allow the device to communicate with other devices. Computing device 1300 may also have input device(s) 1314 such as a keyboard, mouse, pen, voice input device, touch input device, etc. Output device(s) 1316 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Call Center as a Service (CCaaS), Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

What is claimed is:

1. A method comprising:
   providing a routing interface within a CRM system, the routing interface allowing a user to define routing parameters for a communication from a contacting user;
   accessing CRM data based on the routing parameters;

receiving a selection of a routing flow based on the CRM data, wherein the routing flow comprises a series of if statements to route a communication from the contacting user;

generating a routing data package comprising the routing parameters, the selected routing flow, and the CRM data; and updating a routing state machine based on the routing data package.

2. The method of claim 1, further comprising:

receiving the communication from the contacting user; and routing the communication according to the routing state machine.

3. The method of claim 1, wherein the CRM data comprises one or more of agent numbers and ring groups.

4. The method of claim 1, wherein updating the routing state machine comprises:

providing the routing data package to a communication management system; and causing the communication management system to update the routing state machine based on the routing parameters, the selected routing flow, and the CRM data of the routing data package.

5. The method of claim 4, wherein the communication management system comprises a contact center.

6. The method of claim 1, wherein the communication comprises one or more of a telephone call, an email, or a text message.

7. The method of claim 1, wherein accessing the CRM data based on the routing parameters comprises performing a data dip into a CRM database.

8. A system comprising:

at least one processor; and at least one non-transitory computer-readable storage medium storing instructions that, when executed by the at least one processor, cause the system to:

provide a routing interface within a CRM system, the routing interface allowing a user to define routing parameters for a communication from a contacting user;

access CRM data based on the routing parameters;

receive a selection of a routing flow based on the CRM data, wherein the routing flow comprises a series of if statements to route a communication from the contacting user;

generate a routing data package comprising the routing parameters, the selected routing flow, and the CRM data; and update a routing state machine based on the routing data package.

9. The system of claim 8, further comprising instructions that, when executed by the at least one processor, cause the system to:

receive the communication from the contacting user; and route the communication according to the routing state machine.

10. The system of claim 8, wherein the CRM data comprises one or more of agent numbers and ring groups.

11. The system of claim 8, wherein updating the routing state machine comprises:

providing the routing data package to a communication management system; and causing the communication management system to update the routing state machine based on the routing parameters, the selected routing flow, and the CRM data of the routing data package.

12. The system of claim 11, wherein the communication management system comprises a contact center.

13. The system of claim 8, wherein the communication comprises one or more of a telephone call, an email, or a text message.

14. The system of claim 8, wherein accessing the CRM data based on the routing parameters comprises performing a data dip into a CRM database.

15. A non-transitory computer-readable medium storing instructions that, when executed by at least one processor, cause a computer system to:

provide a routing interface within a CRM system, the routing interface allowing a user to define routing parameters for a communication from a contacting user;

access CRM data based on the routing parameters;

receive a selection of a routing flow based on the CRM data, wherein the routing flow comprises a series of if statements to route a communication from the contacting user;

generate a routing data package comprising the routing parameters, the selected routing flow, and the CRM data; and update a routing state machine based on the routing data package.

16. The computer-readable medium of claim 15, further comprising instructions that, when executed by the at least one processor, cause the computer system to:

receive the communication from the contacting user; and route the communication according to the routing state machine.

17. The computer-readable medium of claim 15, wherein the CRM data comprises one or more of agent numbers and ring groups.

18. The computer-readable medium of claim 15, wherein updating the routing state machine comprises:

providing the routing data package to a communication management system; and causing the communication management system to update the routing state machine based on the routing parameters, the selected routing flow, and the CRM data of the routing data package.

19. The computer-readable medium of claim 18, wherein the communication management system comprises a contact center.

20. The computer-readable medium of claim 15, wherein the communication comprises one or more of a telephone call, an email, or a text message.

* * * * *